United States Patent [19]

Stewart

[11] Patent Number: 4,775,209

[45] Date of Patent: Oct. 4, 1988

[54] FIBER-OPTIC COUPLER COMPRISING INTERTWINED MONOMODE FIBERS OF DIFFERENT DIAMETER

[75] Inventor: William J. Stewart, Northampton, England

[73] Assignee: Plessey Overseas Limited, Ilford, England

[21] Appl. No.: 22,707

[22] Filed: Feb. 20, 1987

[30] Foreign Application Priority Data

Feb. 21, 1986 [GB] United Kingdom ............... 8604334

[51] Int. Cl.$^4$ .................................... G02B 6/26
[52] U.S. Cl. .................................... 350/96.15
[58] Field of Search .................. 350/96.15, 96.16

[56] References Cited

U.S. PATENT DOCUMENTS

| | | | |
|---|---|---|---|
| 4,550,974 | 11/1985 | Murphy | 350/96.15 |
| 4,647,146 | 3/1987 | Karr, III et al. | 350/96.15 |
| 4,726,643 | 2/1988 | Imato et al. | 350/96.16 |

FOREIGN PATENT DOCUMENTS

| | | |
|---|---|---|
| 1143973 | 4/1983 | Canada ............................ 350/96.16 |
| 2030318 | 4/1980 | United Kingdom . |
| 2018460 | 10/1981 | United Kingdom . |
| 1600324 | 10/1981 | United Kingdom . |
| 2150703 | 7/1985 | United Kingdom . |

Primary Examiner—John D. Lee
Assistant Examiner—Phan Heartney
Attorney, Agent, or Firm—Michael F. Oglo; Julian C. Renfro

[57] ABSTRACT

A coupler (FIG. 4) comprising a pair of interwined monomode fibers optically coupled along a portion of their length. The diameter of one fiber is significantly smaller than that of the other and this fiber is thus wound helically. A helical pitch not exceeding 10 mm is chosen. For such pitch, the smaller diameter fiber is appreciably longer. The following inequality thus holds:

$$\lambda_c \cdot L/\Delta L \leq L_c:$$

where
$\lambda_c$ is the design wavelength,
$\Delta L/L$ is the difference in fiber lengths per unit length, and $L_c$ is the interaction length of the coupler. The signal coupling of the coupler is than a strongly peaked function of wavelength. The coupler is suited to wavelength multiplex/demultiplex applications.

2 Claims, 4 Drawing Sheets

FIBER-OPTIC COUPLER COMPRISING INTERTWINED MONOMODE FIBERS OF DIFFERENT DIAMETER

BACKGROUND OF THE INVENTION

Field of the Invention

The present invention concerns improvements in or relating to fibre-optic couplers.

Fiber-optic couplers are required in many fiber communication systems and have application for example as wavelength multiplexers/demultiplexers. In the latter application good wavelength selectivity is highly desirable.

Description of Related Art

The taper-twist fiber coupler for monomode fibers is well known (See, for example, Burres J. et al., Applied Optics 22 (1983) p. 1918). Such a coupler 10 is illustrated in FIG. 1. Here a pair of nominally identical monomode fibres 11 and 12 have been intertwined and, to form the coupler 10, these are stretched under tension and fused together. The intertwining assists merely to bring the two fibres 11 and 12 together to allow effective contact and fusion over a predetermined portion L of their length.

Such devices are modestly wavelength-selective as normally made as a result of their coupling properties. These effects are well-understood and can be described by the equations:

$$P_1 = 1 - F^2 \sin^2(Cz/F);$$

$$P_2 = F^2 \sin^2(Cz/F);$$

where $P_1$, $P_2$ are the powers flowing in fibers 11, 12 as a function of distance Z along the fibres, and it is assumed that initially $P_1 = 1$, $P_2 = 0$;

C represents the coupling constant, a measure of the degree to which the fields are coupled, and the function F is defined by the relation:

$$F = \left(1 + \frac{\Delta\beta 2}{4C^2}\right)^{-\frac{1}{2}}$$

where $\Delta\beta$ is the difference between the propagation constants of the modes in the two fibres (without coupling).

The above formulae are not exact but are very good for practical purposes.

It is a widespread requirement that the coupler behave differently at different optical wavelengths (for example, for wavelength multiplexing etc.). To some extent this will occur anyway because the coupling constant C is approximately inversely proportional to wavelength. This produces an oscillatory behaviour of $P_1$, $P_2$ as the wavelength is varied. If z is large (i.e. $C/F >> 2\pi$) this variation with wavelength can be very rapid. However, it gives a near-sinusoidal wavelength response that is less useful than a response giving, for example, coupling only at or about a given wavelength. This can, however, be achieved by using also a variation of the function F with wavelength, so that at one wavelength the propagation constant difference $\Delta\beta \sim 0$ giving $F \sim 1$ but elsewhere $\Delta\beta$ is large enough to make F small, hence reducing coupling. Since it gives a simple, convenient response this latter is the preferred technique for making wavelength selective couplers. Note that simultaneous control of C and F is necessary.

For the fiber case in particular taper-fused fibers have been made from identical fibers (F = 1) by twisting the fibers together and heating them, pulling at the same time. The effect of this is to reduce the core diameter and cause the core mode to become a cladding mode. Further pulling increases the coupler 'z', giving the first kind of wavelength selective coupler (ie. C-dependant) described above.

In producing the second, more satisfactory, type of coupler (i.e. C and F dependant) in this way, a difficulty is encountered. Although good core mode couplers of this type can be made using dissimilar fibers, fused couplers use cladding modes and this causes problems. To see this, consider FIG. 2. This illustrates variation of the propagation constant $\beta$ with wavelength $\lambda$, and is plotted for two values of fibre diameter (a) $2a_1$, the larger and (b) $2a_2$.

Here the propagation constant $\beta$ will vary with wavelength $\lambda$ for the cladding modes and the manner of this variation can be changed by using fibers 11 and 12 of different diameter $2a_1$, $2a_2$. However, because the fibers 11 and 12 generally have claddings which are all made of the same material, (silica in most cases), the curves (a) and (b) in FIG. 2 do not touch except in the trivial case in which the fibers are identical (not shown). If the cladding of the smaller fiber ($a_2$) were made of a special material of higher refractive index $\eta_2$ than the normal index $\eta$, this would have the effect of displacing the lower curve (b) upwards so that the desired crossing is produced (See FIG. 3). However, this is inconvenient and may produce problems in splicing.

SUMMARY OF THE INVENTION

The present invention is intended as a solution to the problems aforesaid. As will be described below, it is now found possible to provide a common propagation constant value at a given and practical wavelength value that does not require provision of fiber claddings of significantly different refractive index. This is especially convenient since the smaller diameter ($2a_2$) fiber may then be provided as a pretapered version of the other.

In accordance with the invention thus, there is provided a fiber-optic coupler including a pair of intertwined monomode fibers optically coupled along a portion of their length, the fibers being of different diameter;

*characterised in that* the fiber of smaller diameter is helically wound about the other fiber to a fine helical pitch such that the following inequality is satisfied: $\lambda_c \cdot L/\Delta L \leq L_c$; where $\lambda_c$ is the design wavelength, $\Delta L/L$ is the difference in fibre lengths per unit length, and $L_c$ is the interaction length of the coupler.

Despite the fact that the fibers may be of very similar, if not identical, refractive index, the optical path length for the fiber of the smaller diameter is substantially larger than that of the other fiber. It is found that this has the effect of providing a common propagation constant $\beta$ value at practical values of wavelength. In terms of pitch, a value of ten millimeters approximately has been found as an upper limit for conventional fibers, corresponding here to practical half-power linewidths, as will be further detailed below.

DESCRIPTION OF A PREFERRED EMBODIMENT

So that this invention may be better understood, an embodiment thereof will now be described, and with particular reference to remaining FIGS. 4 to 8 of the accompanying drawings. The description that follows is given by way of example, only.

Figure 1:
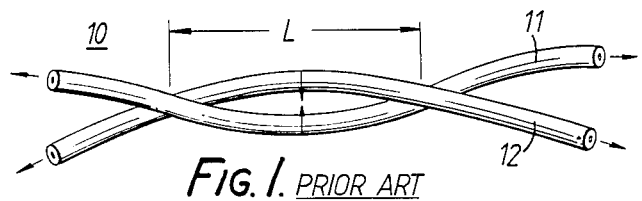
FIG. 1 is a perspective view of a known type of taper-twist fiber coupler.
Figure 2:
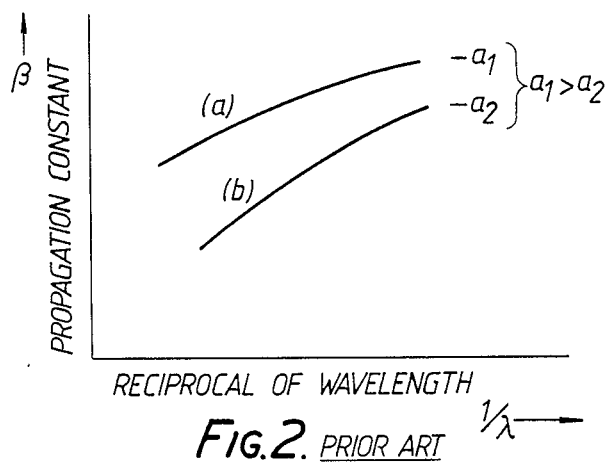
FIGS. 2 and 3 are graphs showing the wavelength dependance of the propagation constants $\beta$ of fibers of different diameter, and of different diameter and cladding refractive index $\eta$, respectively.
Figure 3:
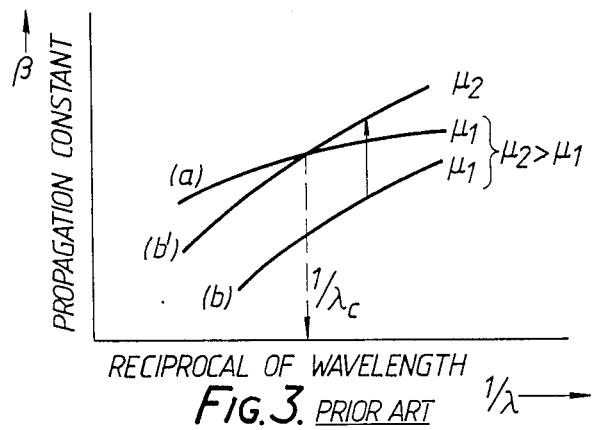
Figure 4:
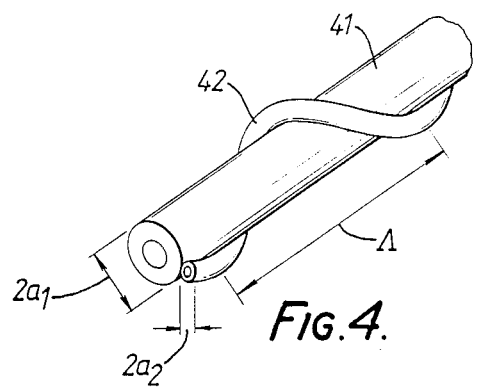
FIG. 4 is a perspective view of a helical-twist fiber coupler, a coupler constructed in accord with this invention.

As shown in FIG. 4 two fibers 41 and 42 have been intertwined, drawn together, and fused along a portion of their length. The fibers 41 and 42 shown are of grossly different diameters $2a_1$ and $2a_2$. It will be noted that the smaller fiber 42, of diameter $2a_2$ is wound in a helix around the larger one 41. This effect will be produced just by elastic effects, since the fibers are so dissimilar in diameter, though the degree of twist i.e. helical pitch $\Lambda$ can be varied. Of course, the larger fiber 41 will also wind a little about its own axis.

The important effect of the asymmetry in this twist is that the helical path followed by the smaller fiber 42 is longer for a given axial measurement 'z' than that followed by the larger 41. This simulates a higher refractive index. The amount of this effect present can be regulated by changing the helical period $\Lambda$, either prior to or during the fusing process. Note that the fibers 41 and 42 must not fuse together and merge too much because this will cause the field not to 'follow' the smaller fiber 42 and thus destroy the effect desired.

Figure 5:
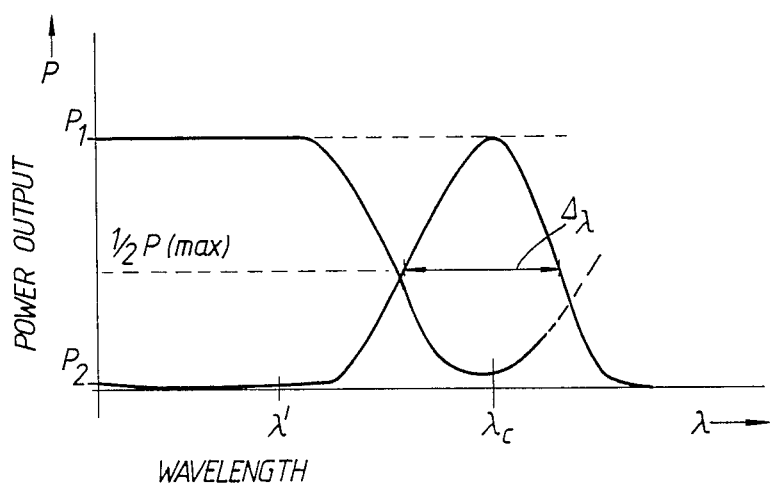
FIG. 5 is a representative graph showing the wavelength dependant output power P of the coupler shown in the preceding figure.

As shown in FIG. 5 the foregoing approach leads to wavelength restricted coupling. Power is exchanged from one fiber to the other over a band of limited width. The graph depicts the half-power linewidth $\Delta\lambda$ centred on a wavelength $\lambda_c$. It is thus feasible to multiplex signals of closely spaced wavelength $\lambda', \lambda_c$ as shown.

Figure 6:
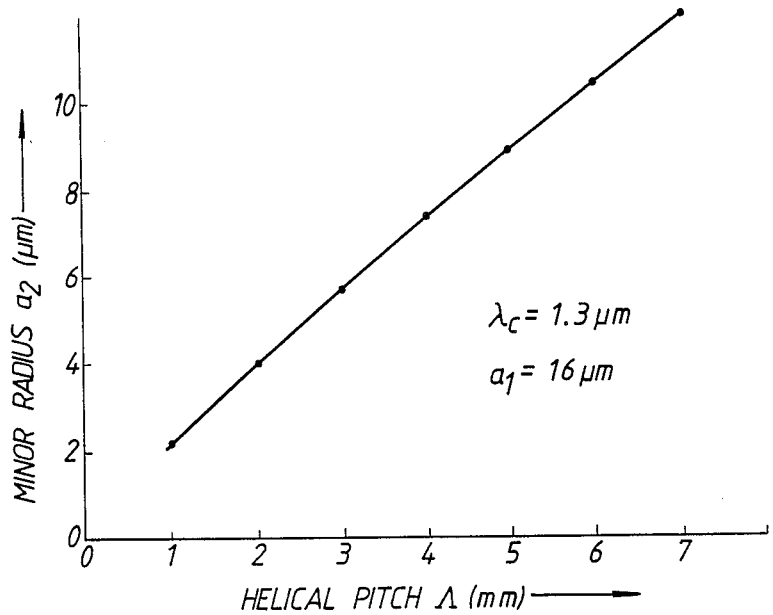
FIGS. 6 and 7 are graphs showing the relationship between the choice of helical pitch $\Lambda$ and minor radius and resultant linewidth, respectively, for the coupler of FIG. 4; and, FIG. 8 is a graph showing the dependance of the coupler function F as variable of the drawing process.
Figure 7:
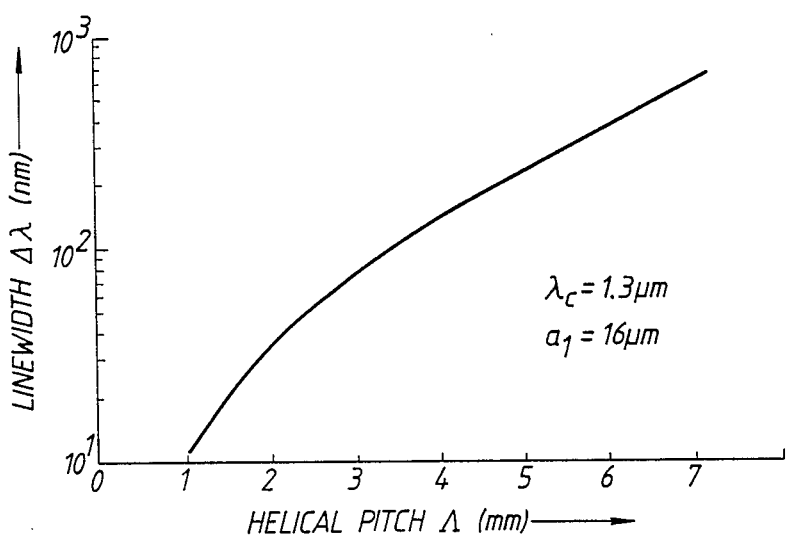
Figure 8:
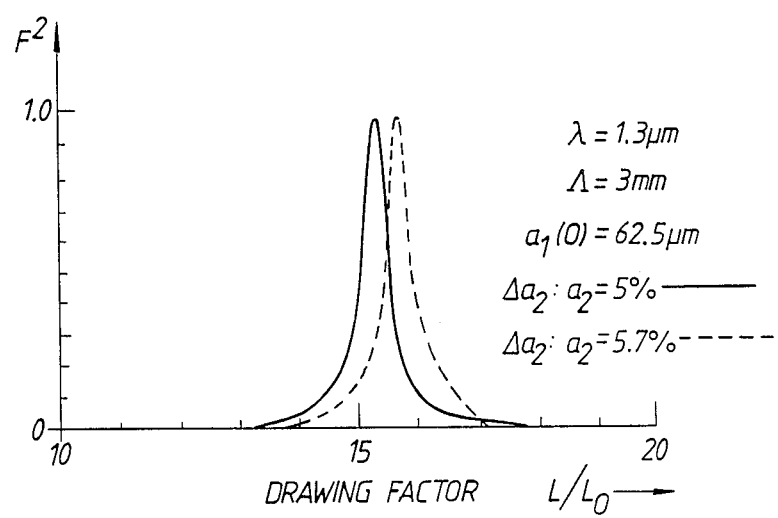

Typical design criteria, calculated for the helical coupler, are shown in the remaining FIGS. 6 to 8. The calculations have been performed for a coupler centred on a wavelength of 1.3 $\mu$m and using a conventional monomode fiber 41 of larger diameter, radius 16 $\mu$m, as former for the helical winding 42. As shown in FIG. 7 the linewidth increases monotonically as a function of the helical pitch. Linewidths of little practical value can be expected at pitch $\Lambda$ above 10 mm. The linewidth $\Delta\lambda$ spans values in the range 10 to $10^3$ nm for helical pitch from 1 to 7 (plus) millimeters. The appropriate values of minor radius $a_2$, for the helically wound fiber 42, are depicted in FIG. 6 and vary from 2 to 12 $\mu$m for the same range of pitch. 50% coupling has been assumed throughout in defining linewidths.

The coupler may be manufactured by winding a pre-drawn fiber 42 (a fiber drawn from the same batch as the large diameter fiber) about the larger diameter fibre 41, drawing under tension and fusing the two fibers 41 and 42 together. The effect of stretching the larger fibre has little bearing upon the resultant properties of the coupler. This is shown in FIG. 8 where the coupler function F has been shown as a function of the drawing factor L/Lo. Two curves are shown. One in bold outline assumes that the major radius is varied by 5%, the other, in broken outline, assumes that the major radius is varied by 5.7%. The fiber 42 starts with radius of initial value 62.5 $\mu$m and is drawn to a final radius found optimum at about 1.3 $\mu$m at a helical pitch of 3 mm for a line centred on 1.3 $\mu$m wavelength.

I claim:

1. In a fiber-optic coupler comprising a pair of intertwined monomode fibers optically coupled along a portion of their length, the fibers being of different diameter; the improvement wherein the fiber of smaller diameter is helically wound about the other fiber to a fine helical pitch such that the following inequality is satisfied:

$\lambda_c \cdot L/\Delta L \leq L_c$; where $\lambda_c$ is the design wavelength, $\Delta L/L$ is the difference in fiber lengths per unit length, and $L_c$ is the interaction length of the coupler.

2. A coupler as claimed in claim 1 wherein the fiber of smaller diameter is a fiber drawn from a fiber nominally identical to the fiber of larger diameter.

* * * * *